(12) United States Patent
Ng (10) Patent No.: US 10,298,310 B2
(45) Date of Patent: May 21, 2019

(54) CHANNEL QUALITY INDICATOR METHOD, AND ASSOCIATED SYSTEM, BASE STATION, AND USER EQUIPMENT

(71) Applicant: LENOVO INNOVATIONS LIMITED (HONG KONG), Hong Kong (CN)

(72) Inventor: Boon Loong Ng, Victoria (AU)

(73) Assignee: LENOVO INNOVATIONS LIMITED (HONG KONG), Hong Kong (CN)

( * ) Notice: Subject to any disclaimer, the term of this patent is extended or adjusted under 35 U.S.C. 154(b) by 0 days.

(21) Appl. No.: 15/388,992

(22) Filed: Dec. 22, 2016

(65) Prior Publication Data

US 2017/0117949 A1  Apr. 27, 2017

Related U.S. Application Data

(60) Continuation of application No. 13/590,695, filed on Aug. 21, 2012, now Pat. No. 9,531,521, which is a
(Continued)

(30) Foreign Application Priority Data

Mar. 19, 2009 (AU) ................................ 2009901196

(51) Int. Cl.
*H04W 24/10* (2009.01)
*H04B 7/06* (2006.01)
(Continued)

(52) U.S. Cl.
CPC ........... *H04B 7/0632* (2013.01); *H04B 7/024* (2013.01); *H04B 7/0413* (2013.01);
(Continued)

(58) Field of Classification Search
CPC .... H04J 3/1694; H04L 1/0026; H04L 1/0028; H04L 5/0016; H04L 5/0035;
(Continued)

(56) References Cited

U.S. PATENT DOCUMENTS 6,149,749 A    11/2000  McBroom
8,149,749 B2 *  4/2012  Maeda ................. H04B 7/2643
                                                    370/311

(Continued)

FOREIGN PATENT DOCUMENTS

CN         101369843 A     2/2009
WO         2007/145035 A1  12/2007
WO      WO 2007/145035   * 12/2007  ........ H04W 52/0216

OTHER PUBLICATIONS

Samsung, "Impact of DL CQI RS Insertion on Rel-8 PDSCH Performance", R1-090621, Feb. 13, 2009.*
(Continued)

*Primary Examiner* — Asad M Nawaz
*Assistant Examiner* — Zhaohui Yang
(74) *Attorney, Agent, or Firm* — Kunzler Bean & Adamson (57) ABSTRACT

It would be to provide a method which will work with future versions of LTE-A, be backwards compatible and alleviate interference to signals for basic system operation.
The method includes generating one or more Reference Signals associated with the one or more Channel Quality Indicators, and includes mapping the one or more Channel Quality Indicator-Reference Signals to the last symbol of the second slot of the one or more subframes.

14 Claims, 9 Drawing Sheets

Related U.S. Application Data division of application No. 13/543,172, filed on Jul. 6, 2012, which is a division of application No. 13/257,462, filed as application No. PCT/JP2010/055144 on Mar. 17, 2010, now Pat. No. 9,077,503.

(51) Int. Cl.
| | |
|---|---|
| *H04L 1/00* | (2006.01) |
| *H04L 5/00* | (2006.01) |
| *H04J 3/16* | (2006.01) |
| *H04L 5/14* | (2006.01) |
| *H04B 7/024* | (2017.01) |
| *H04B 7/0413* | (2017.01) |
| *H04L 27/26* | (2006.01) |
| *H04W 72/04* | (2009.01) |
| *H04W 74/08* | (2009.01) |
| *H04W 16/14* | (2009.01) |

(52) U.S. Cl.
CPC .......... *H04B 7/0639* (2013.01); *H04J 3/1694* (2013.01); *H04L 1/0026* (2013.01); *H04L 1/0028* (2013.01); *H04L 5/0035* (2013.01); *H04L 5/0048* (2013.01); *H04L 5/0051* (2013.01); *H04L 5/0057* (2013.01); *H04L 5/14* (2013.01); *H04L 27/2601* (2013.01); *H04L 27/2607* (2013.01); *H04W 24/10* (2013.01); *H04W 72/0446* (2013.01); *H04W 74/085* (2013.01); *H04L 5/0016* (2013.01); *H04L 5/0053* (2013.01); *H04W 16/14* (2013.01)

(58) Field of Classification Search
CPC ... H04L 5/0048; H04L 5/0053; H04L 5/0057; H04L 5/14; H04L 27/2601; H04L 27/2607; H04L 5/0051; H04W 16/14; H04W 24/10; H04W 72/0446; H04W 74/085; H04B 7/024; H04B 7/0413; H04B 7/0632; H04B 7/0639
See application file for complete search history.

(56) References Cited

U.S. PATENT DOCUMENTS

| | | | | |
|---|---|---|---|---|
| 8,259,657 | B2* | 9/2012 | Inoue | H04L 1/0026 370/329 |
| 8,379,507 | B2 | 2/2013 | Bertrand et al. | |
| 9,077,203 | B2 | 7/2015 | Ng | |
| 2006/0009227 | A1* | 1/2006 | Cudak | H04L 5/005 455/450 |
| 2008/0139237 | A1 | 6/2008 | Papasakellariou | |
| 2008/0186911 | A1 | 8/2008 | Bachl et al. | |
| 2008/0253484 | A1 | 10/2008 | Kakura et al. | |
| 2008/0267165 | A1* | 10/2008 | Bertrand | H04J 3/06 370/350 |
| 2009/0042558 | A1 | 2/2009 | Shen et al. | |
| 2009/0046570 | A1 | 2/2009 | Sarkar et al. | |
| 2009/0067391 | A1* | 3/2009 | Shen | H04L 1/0027 370/336 |
| 2009/0154588 | A1 | 6/2009 | Chen et al. | |
| 2009/0168662 | A1* | 7/2009 | Tsuboi | H04L 1/20 370/252 |
| 2009/0201825 | A1 | 8/2009 | Shen et al. | |
| 2009/0209256 | A1* | 8/2009 | Nakashima | H04W 36/0088 455/436 |
| 2009/0231993 | A1 | 9/2009 | Zhang et al. | |
| 2009/0232065 | A1 | 9/2009 | Zhang et al. | |
| 2009/0238256 | A1 | 9/2009 | Onggosanusi et al. | |
| 2009/0252077 | A1 | 10/2009 | Khandekar et al. | |
| 2010/0046412 | A1 | 2/2010 | Varadarajan et al. | |
| 2010/0091893 | A1 | 4/2010 | Gorokhov | |
| 2010/0118989 | A1 | 5/2010 | Sayana et al. | |
| 2010/0124291 | A1 | 5/2010 | Muharemovic et al. | |
| 2010/0127931 | A1* | 5/2010 | Rensburg | H01Q 3/04 342/372 |
| 2010/0172311 | A1* | 7/2010 | Agrawal | H04L 5/0048 370/329 |
| 2010/0195566 | A1 | 8/2010 | Krishnamurthy et al. | |
| 2010/0322100 | A1* | 12/2010 | Wan | H04J 11/0093 370/252 |
| 2011/0159901 | A1 | 6/2011 | Frenger et al. | |
| 2011/0237270 | A1* | 9/2011 | Noh | H04B 7/0413 455/450 |
| 2011/0293037 | A1 | 12/2011 | Liu et al. | |
| 2012/0134316 | A1* | 5/2012 | Seo | H04B 7/15557 370/315 |

OTHER PUBLICATIONS

3GPP, "Evolved Universal Terrestrial Radio Access (E-UTRA); Physical Channels and Modulation (Release 8)", TS 36.211, V8.5.0, published on Dec. 2008, provided as NPL on Aug. 19, 2013 for parent U.S. Appl. No. 13/543,172.*
Translation of WO 2007/145035, provided as NPL on May 20, 2013 for parent U.S. Appl. No. 13/543,172.*
Samsung, Discussions on DL RS Design for Higher Order MIMO, Jan. 2009. 3GPP R1-090103.*
ZTE, "Discussion of CQI-RS design for LTE-A CoMP", 3GPP TSG RAN WG1 #56, R1-090632, Feb. 9-13, 2009, pp. 1-4.
Motorola, "Common Reference Symbol Mapping-signaling for 8 Transmit Antennas", 3GPP TSG RAN1 #54, R1-083224, Aug. 18-22, 2008, pp. 1-5.
Catt, "Downlink Dedicated Reference Symbols Structure for TDD with Frame Structure Type 2", 3GPP TSG RAN WG1 Meeting #49bis, R1-072930, Jun. 25-29, 2007, pp. 1-5.
NTT DOCOMO, "DL RS Design for LTE-Advanced", 3GPP TSG RAN WG1 Meeting #56bis, R1-091483, Mar. 23-27, 2009, pp. 1-6.
Nokia Siemens Networks, Nokia, "CSI-RS design for LTE-Advanced downlink", 3GPP TSG RAN WG1 Meeting #56-bis, R1-091351, Mar. 23-27, 2009, pp. 1-7.
Samsung, "DL RS Designs for Higher Order MIMO", 3GPP TSG RAN WG1 #56, R1-090619, Feb. 9-13, 2009, pp. 1-7.
TD Tech, "Dedicated RS design w/wo overhead reduction", 3GPP TSG RAN WG1#52bis, R1-081338, Mar. 31-Apr. 4, 2008, pp. 1-3.
Catt et al., "Way forward on downlink reference signals for LTE-A", 3GPP TSG-RAN WG1 #56, R1-091066, Feb. 3-13, 2009, pp. 1-2.
NEC Group, "CQI-RS for LTE-Advanced", 3GPP TSG-RAN WG1 Meeting #56bis, R1-091221, Mar. 23-27, 2009. pp. 1-6.
ETSI, "LTE; Evolved Universal Terrestrial Radio Access (E-UTRA);Physical layer procedures", 3GPP TS 36.213 version 8.5.0 Release 8, 2009, pp. 1-76.
ETSI, "LTE; Evolved Universal Terrestrial Radio Access (E-UTRA); Physical channels and modulation", 3GPP TS 36.211 version 8.5.0 Release 8, 2009, pp. 1-85.
Huawei, "DL Coordinated Beam Switching for Interference management in LTE-Advanced", 3GPP TSG RAN WG1#54bis, R1-083710, Sep. 29-Oct. 3, 2008, pp. 1-7.
Qualcomm Europe, "Impact of Downlink CoMP on the Air Interface", 3GPP TSG-RAN WG1 #55bis, R1-090366, Jan. 12-16, 2009, pp. 1-3.

* cited by examiner

CHANNEL QUALITY INDICATOR METHOD, AND ASSOCIATED SYSTEM, BASE STATION, AND USER EQUIPMENT

CROSS REFERENCE TO RELATED APPLICATIONS

This application is a continuation of application Ser. No. 13/590,695 which is a division of application Ser. No. 13/543,172 filed on Jul. 6, 2012, which is a division of U.S. Pat. No. 9,077,503 filed on Sep. 19, 2011, which is a National Stage of PCT/JP2010/055144 filed on Mar. 17, 2010, which claims foreign priority to Australian Application No. 2009901196 filed on Mar. 19, 2009. The entire content of each of these applications is hereby expressly incorporated by reference.

FIELD

The present invention relates to wireless communications systems, and more particularly to a method for determining and transmitting Channel Quality Indicator Reference Signals (CQI-RS) from one or more subframes such that an associated User Equipment (UE) can use the CQI-RS to measure CQI.

BACKGROUND

In advanced mobile communication systems, such as the Long-Term-Evolution (LTE) system and the Long-Term-Evolution Advanced (LTE-A) system, User Equipment (UE) is utilized to measure and to report a number of parameters in the communication system including Rank Indicator (RI), Channel Quality Indicator (CQI) or Precoding Matrix Indicator (PMI) to the evolved Node B (eNB) thereby enabling support of resource allocation, link adaptation and spatial multiplexing transmission.

Currently, LTE (Release-8) RI, CQI/PMI measurement is performed based on the cell-specific reference signals (CRS). Each CRS is associated with transmit antenna ports at the eNB (there is a maximum of 4 transmit antenna ports). Therefore, the maximum number of transmission layers that can be supported for spatial multiplexing is limited by the number of antenna ports available (i.e. 4).

It is envisaged that for LTE-A (Release-10), the number of antenna ports used for spatial multiplexing or the number of transmission layers should be up to 8. Therefore, more Reference Signals are needed to enable the support of higher-order MIMO transmission.

Further, a new technology under consideration for LTE-A is Coordinated Multi-Point (CoMP) transmission. The LTE-A UE may therefore also be required to measure and report the RI, CQI/PMI (or similar metric) for the Reference Signal transmitted from the eNBs that participate in CoMP transmission.

A problem with this increase in complexity is the possibility of interference to signals important for basic system operation together with backward compatibility issues on older UEs.

It would therefore be desirable to provide a method which will work with future versions of LTE-A, be backwards compatible and alleviate interference to signals for basic system operation.

It will be appreciated that a reference herein to any matter which is given as prior art is not to be taken as an admission that that matter was, in Australia or elsewhere, known or that the information it contains was part of the common general knowledge as at the priority date of the claims forming part of this specification.

SUMMARY

A improved channel quality indicator method for determining and transmitting one or more Channel Quality Indicator Reference Signals from one or more subframes such that an associated User Equipment can use the Channel Quality Indicator Reference Signals to measure Channel Quality Indicator, the subframes including first and second slots, each of the first and second slots including a plurality of symbols, and each of the first and second slots forming a resource block, wherein the method comprising:

generating one or more Reference Signals associated with the one or more Channel Quality Indicators;

mapping the one or more Channel Quality Indicator-Reference Signals to the last symbol of the second slot of the one or more subframes.

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

DETAILED DESCRIPTION

Exemplary embodiments of the present invention are next described in detail with reference to the accompanying figures.

Figure 1A:
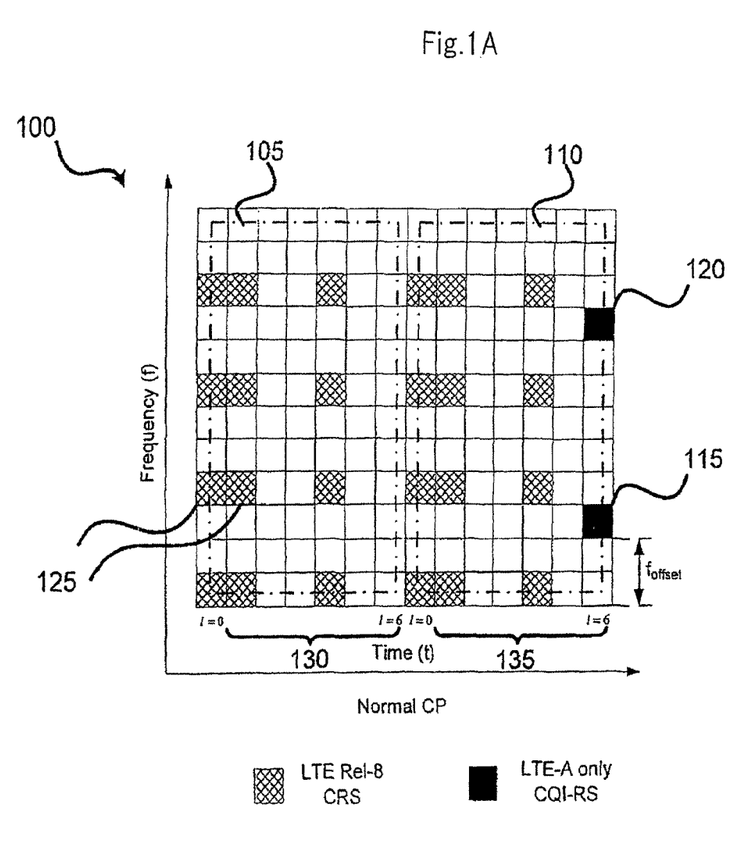
FIG. 1A is a schematic diagram of a subframe having two normal Cyclic Prefix (CP) resource blocks illustrating the location of the CQI-RS for one layer.

Referring now to FIG. 1A, there is shown a subframe 100 having two normal Cyclic Prefix (CP) resource blocks 105, 110. The subframe 100 is shown with a frequency (f) axis and a time (t) axis. The resource blocks 105, 110 are transmission units which are one slot 130, 135 wide in time (t) and twelve subcarriers wide in frequency (f). Included in each of the slots 130, 135 are seven symbols along the time axis for a normal Cyclic Prefix resource block 105, 110. A number of resource elements which make up the overall resource block 105, 110 are cell-specific reference signals (CRS) 25 and first and second "Long Term Evolution—Advanced Channel Quality Indicator-Reference Signal" (LTE-A CQI-RS) 115, 120.

In operation, the CQI-RS of a layer is transmitted in last OFDM symbol (i.e. OFDM symbol number 6 in the second slot 135), in order to avoid collision with Rel-8 cell-specific reference signals (CRS), Rel-8 Dedicated Reference Signal (DRS), and Physical Broadcast CHannel (PBCH) and synchronization signals. Preferably, there are two CQI-RS REs within a resource block 105, 110 and the CQI-RSs are uniformly distributed over the 12 subcarriers of the resource block. Providing two CQI-RS REs for each layer is advantageous since it has been found to provide a good balance between CQI-RS overhead and CQI measurement performance.

Also shown in FIG. 1A, is a first cell-specific subcarrier offset $f_{offset}$ for higher-layer configurations. First $f_{offset}$ determines the Resource Element (RE) location offset of the CQI-RS from the lowest subcarrier index in a resource block. This is shown in Figure IA for First $f_{offset}$=2. In the preferred case of two CQI-RS REs per resource block, First $f_{offset}$ can take value from 0-5.

Figure 1B:
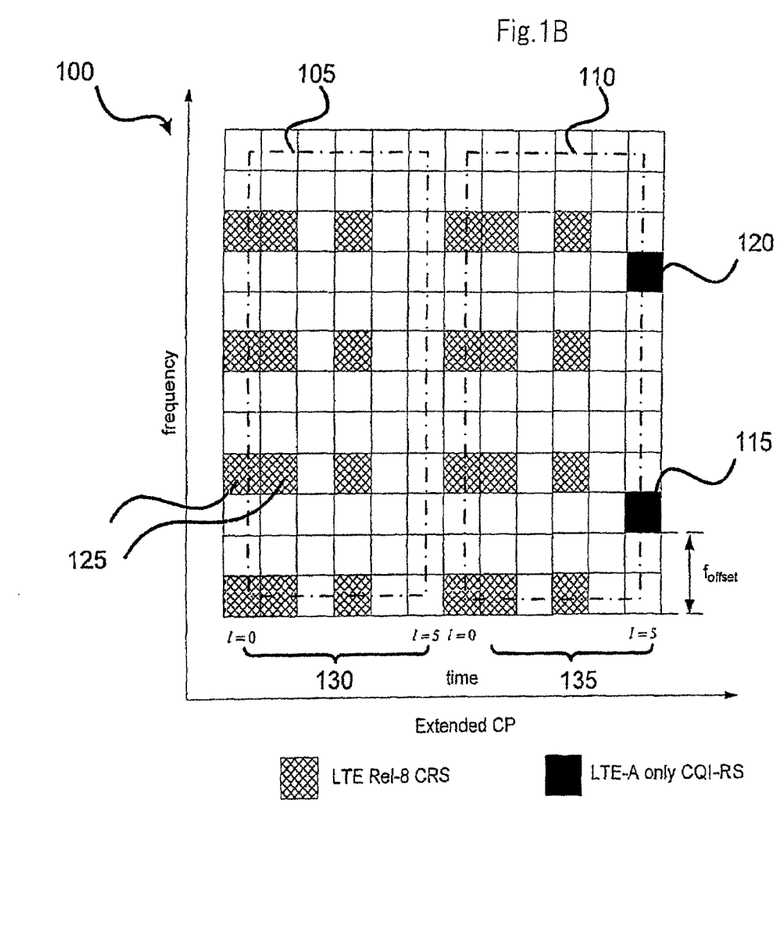
FIG. 1B is a schematic diagram of a subframe having two extended Cyclic Prefix (CP) resource blocks illustrating the location of the CQI-RS for one layer.

Figure IB is identical to FIG. 1A but illustrates a subframe 100 which includes two extended Cyclic Prefix (CP) resource blocks 105, 110. The subframe 100 is shown with a frequency (f) axis and a time (t) axis. The resource blocks 105, 110 are transmission units which are one slot 130, 135 wide in time (t) and twelve subcarriers wide in frequency (f). Each of the slots 130, 135 are six symbols along the time axis for an extended Cyclic Prefix resource block 105, 110. In operation, the CQI-RS of a layer is transmitted in last OFDM symbol (i.e. OFDM symbol number 5 in the second slot 135).

Advantageously, by designing CQI-RS for all layers applicable to LTE-A operation to be placed in only one particular OFDM symbol within a subframe provides a simple way to avoid interference to/from Rel-8 CRS, Rel-8 DRS, and PBCH and synchronization signals.

Figure 2:
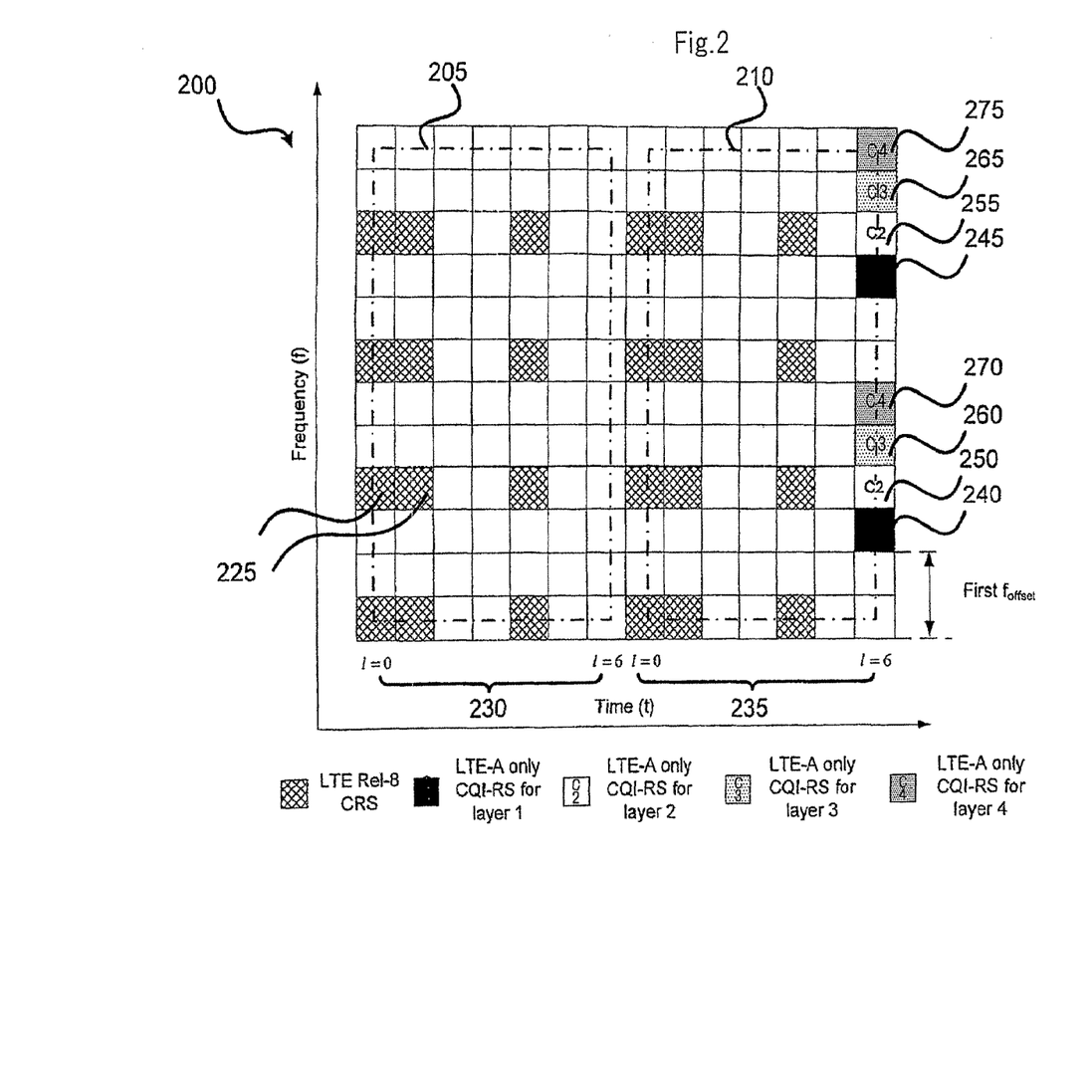
FIG. 2 is a schematic diagram of a subframe having two normal Cyclic Prefix (CP) resource blocks illustrating the location of the CQI-RS for multiple layers for multiplexing via (Frequency Division Multiplexing) FDM.

FIG. 2 is shows a subframe 200 having two normal Cyclic Prefix (CP) resource blocks 205, 210 and further shows the preferred location of the CQI-RS for multiple layers for multiplexing via Frequency Division Multiplexing. Like FIGS. 1A and 1B, the subframe 200 is shown with a frequency (f) axis and a time (t) axis. The resource blocks 205, 210 are transmission units which are one slot 230, 235 wide in time (t) and twelve subcarriers wide in frequency (f). Each of the slots 230, 235 include seven symbols along the time axis for a normal Cyclic Prefix resource block 205, 210. A number of resource elements make up the resource block 205, 210 including cell-specific reference signals (CRS) 225 together with first LTE-A CQI-RS 240 (layer I), second LTE-A CQI-RS 245 (layer I), first LTE-A CQI-RS 250 (layer 2), second LTE-A CQI-RS 255 (for layer 2), first LTE-A CQI-RS 260 (layer 3), second LTE-A CQI-RS 265 (layer 3), first LTE-A CQI-RS 270 (layer 4) and second LTE-A CQI-RS 275 (layer 4).

In FIG. 2, CQI-RS of all layers for LTE-A operation are transmitted in the same OFDM symbol (i.e. symbol number 6) for the case that the layers are multiplexed via FDM. The particular arrangement within the FDM framework is illustrative, other arrangements are possible.

Figure 3:
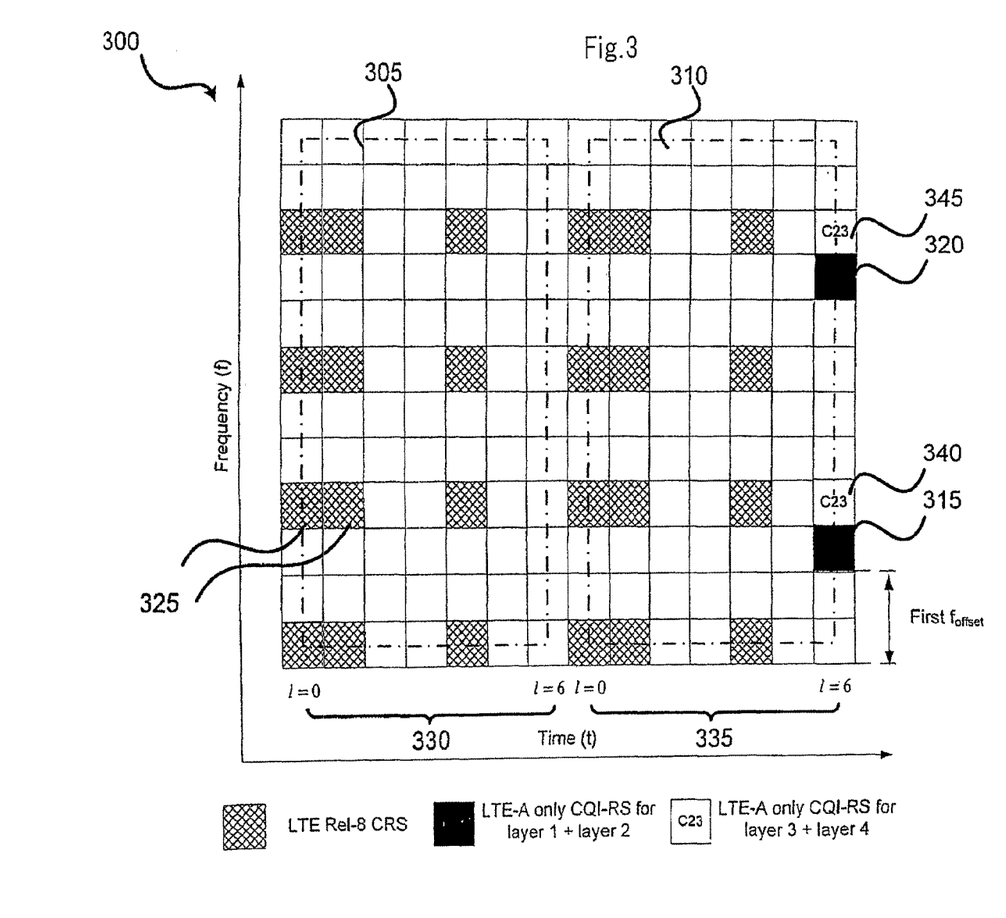
FIG. 3 is a schematic diagram of a subframe having two normal Cyclic Prefix (CP) resource blocks illustrating the location of the CQI-RS for multiple layers for multiplexing via hybrid FDM and (Code Division Multiplexing) CDM.

FIG. 3 shows a subframe 300 having two normal Cyclic Prefix (CP) resource blocks 305, 310 and further shows the preferred location of the CQI-RS for multiple layers for multiplexing via hybrid Frequency Division Multiplexing (FDM) and Code Division Multiplexing (CDM). A number of resource elements make up the resource block 305, 310 including cell-specific reference signals (CRS) 325 together with first LTE-A CQI-RS 315 (layer 1 and layer 2), second LTE-A CQI-RS 320 (layer 1 and layer 2), first LTE-A CQI-RS 340 (layer 3 and layer 4) and second LTE-A CQI-RS 345 (layer 3 and layer 4).

In FIG. 3, CQI-RS of all layers for LTE-A operation are transmitted in the same OFDM symbol (i.e. symbol number 6) for the case that the layers are multiplexed hybrid via FDM and CDM. The particular arrangement within the hybrid FDM and CDM framework is illustrative, other arrangements are possible.

Figure 4:
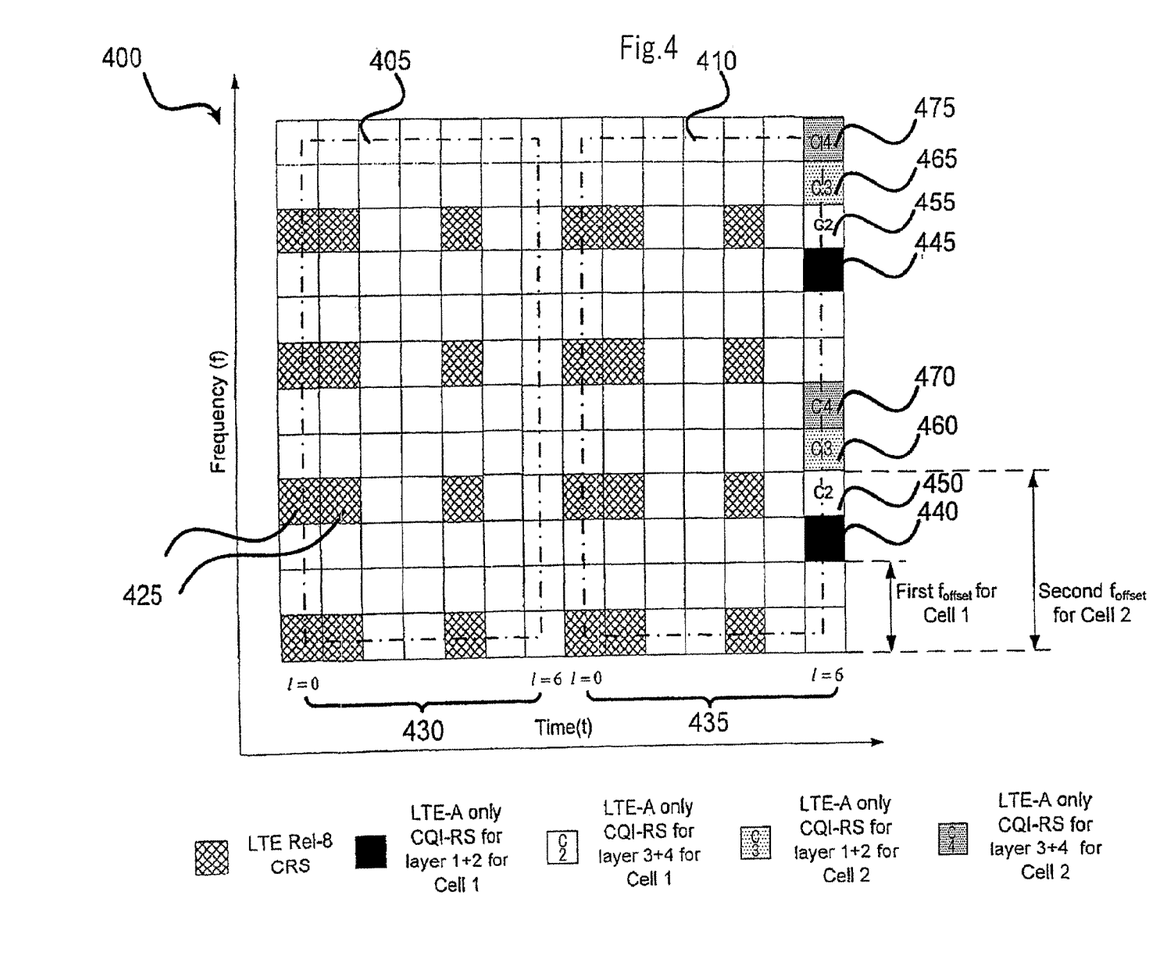
FIG. 4 is a schematic diagram of a subframe having two normal Cyclic Prefix (CP) resource blocks illustrating the location of the CQI-RS for multiple layers for CoMP cells multiplexed via hybrid FDM and CDM.

FIG. 4 shows a subframe 400 having two normal Cyclic Prefix (CP) resource blocks 405, 410 illustrating the location of the CQI-RS for multiple layers for CoMP cells multiplexed via hybrid FDM and CDM. In operation, the CQI-RS of a layer is transmitted in last OFDM symbol (i.e. OFDM symbol number 6 in the second slot 435), in order to mitigate CQI-RS intercell interference. The intercell interference is further reduced by including a first cell- specific subcarrier offset First $f_{offset}$ and a second cell-specific subcarrier offset Second $f_{offset}$. First $f_{offset}$ determines the Resource Element (RE) location offset of the CQI-RS from the lowest subcarrier index of a resource block for Cell-1. This is shown in FIG. 4 for First $f_{offset}$=2. Second $f_{offset}$ determines the Resource Element (RE) location offset of the CQI-RS from the lowest subcarrier index of a resource block for Cell-2. This is shown in FIG. 4 for Second $f_{offset}$=4. Therefore, LTE-A CQI-RS are as follows: first LTE-A CQI-RS 440 (layer 1 and 2 for cell 1), second LTE-A CQI-RS 445 (layer 1 and 2 for cell 1), first LTE-A CQI-RS 450 (layer 3 and 4 for cell 1), second LTE-A CQI-RS 455 (layer 3 and 4 for cell 1), first LTE-A CQI-RS 460 (layer 1 and 2 for cell 2), second LTE-A CQI-RS 465 (layer 1 and 2 for cell 2), first LTE-A CQI- RS 470 (layer 3 and 4 for cell 2) and second LTE-A CQI-RS 475 (layer 3 and 4 for cell 2).

Figure 5:
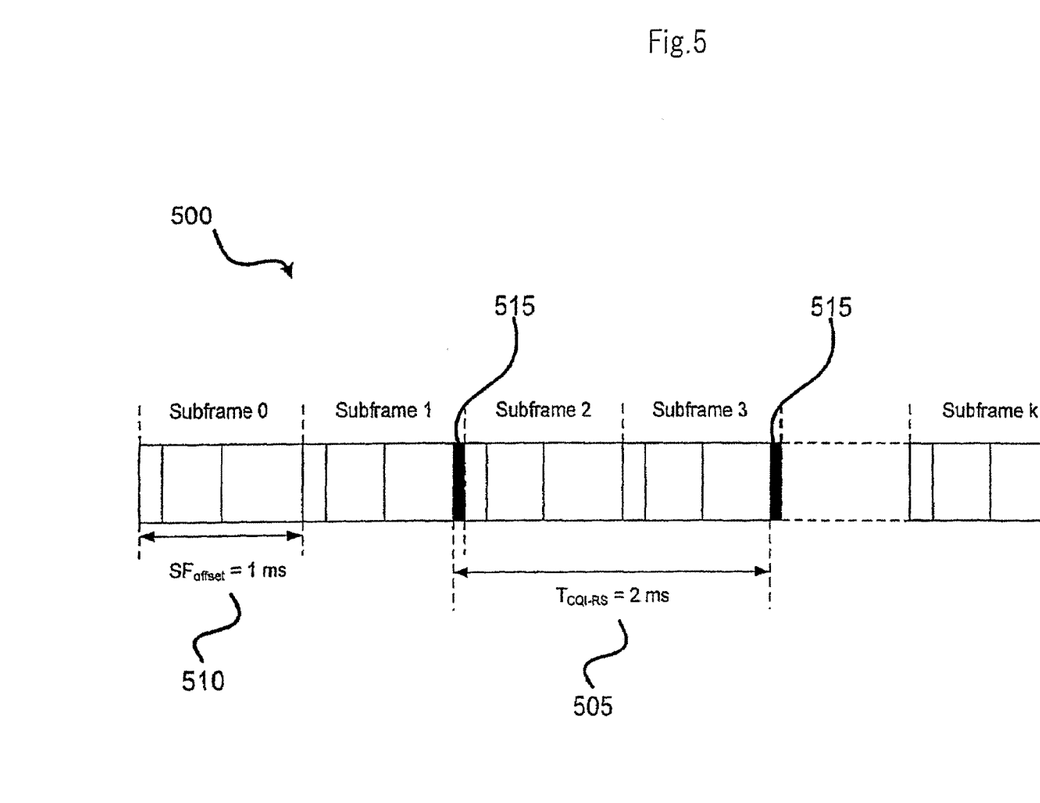
FIG. 5 is a schematic diagram of a series of subframes illustrating use of a cell-specific subframe offset.

Advantageously, foffset allows for robust intercell interference management for CoMP CQI-RS transmission. Transmission Period Configuration of LTE-A only CQI-RS FIG. 5 is a schematic diagram of a series of subframes 500 illustrating use of a cell- specific subframe offset SFoffset 510 and the CQI-RS transmission period, $T_{CQI-Rs}$ 505. $T_{CQI-Rs}$, 505 is the same as the CQI/PMI reporting period for LTE Rel-8, i.e. 2 ms, 5 ms, 10 ms, 20 ms, 40 ms, 80 ms and 160 ms for Frequency Division Duplex (FDD), and 1 ms, 5 ms, 10 ms, 20 ms, 40 ms, 80 ms and 160 ms for Time Division Duplex (TDD). However, $T_{CQI-Rs}$ 505 is cell-specific while the CQVPMI reporting period is DE-specific, hence the configuration of $T_{CQI-Rs}$ 505 and CQVPMI reporting period are independent. In practice, the CQVPMI reporting period is generally not shorter than $T_{CQI-Rs}$ 505.

Higher-layer configured cell-specific subframe offset SFoffset 510 determines the subframe offset for CQI-RS transmission relative to subframe 0 within a frame. SFoffset takes the value from 0 ms to (TCQI-RS-1) ms. FIG. 5 shows a $T_{CQI-Rs}$ 505 of 2 ms and SFoffset of 1 ms.

Advantageously, $T_{CQI\text{-}Rs}$. 505 is useful in controlling the CQI-RS overhead whereas SFoffset 510 is useful for mitigating CQI-RS intercell interference among CoMP cells.

Figure 6:
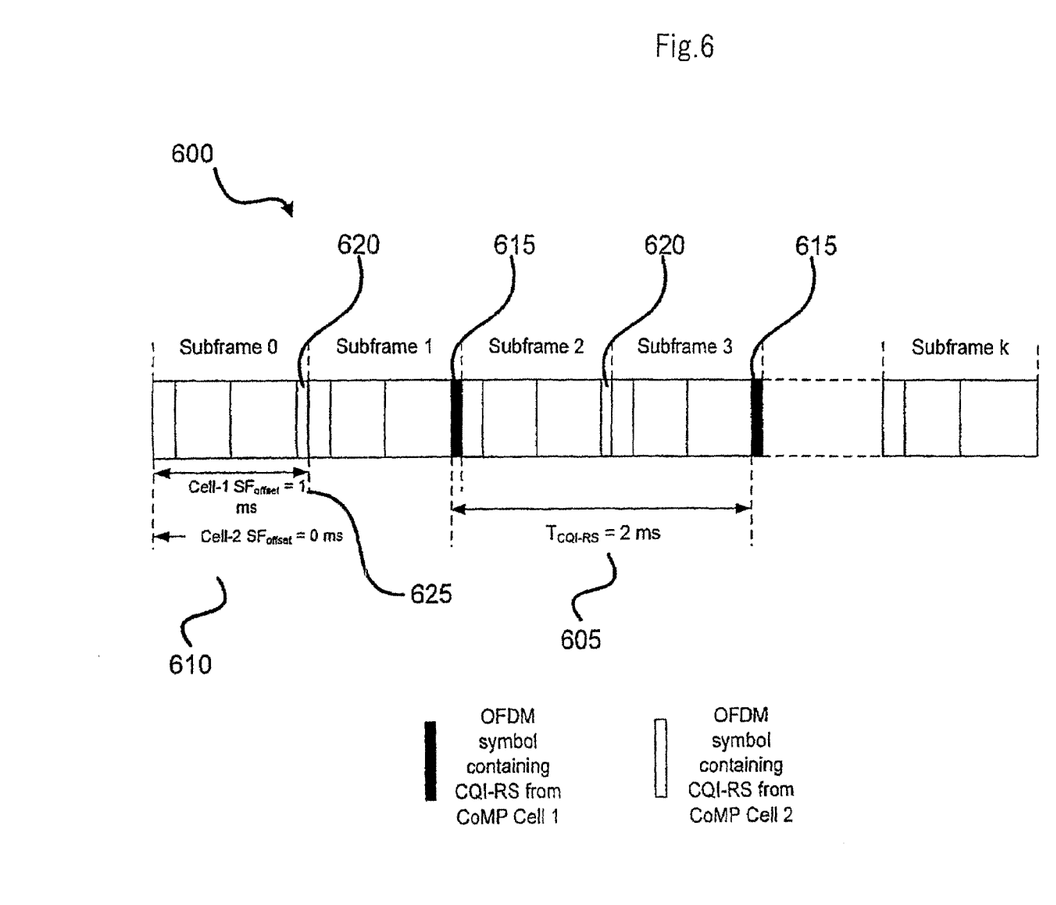
FIG. 6 is a schematic diagram of a series of subframes illustrating use of a cell-specific subframe offset designed for CoMP cells.

FIG. 6 shows a series of subframes 600 and illustrates an example of how SFoffset can be used to avoid CQI-RS of different CoMP cells being transmitted in the same subframe. In this case Cell-1 SFoffset 625 has a value of 1 ms and Cell-2 SFoffset 610 has a value of 0 ms and a $T_{CQI\text{-}Rs}$. 605 of 2 ms.

Resource Block Allocation for LTE-A only CQI-RS

The CQI-RS subband which may be denoted k is defined in the similar way as the CQI-reporting subband for LTE Rel-8. The CQI-RS subband size or equivalently the total number of resource blocks that contain CQI-RS is determined based on the system bandwidth for a single component carrier, similar to the CQI-reporting subband size determination for LTE Rel-8. Specifically, the CQI-RS subband size is determined as shown in Table 1.

TABLE 1

CQI-RS Subband Size k vs. System Bandwidth
of a single component carrier

| System Bandwidth of a single component carrier | CQI-RS Subband Size, k |
|---|---|
| 6-7 | Entire system bandwidth |
| 8-10 | 4 |
| 11-26 | 4 |
| 27-63 | 6 |
| 64-110 | 8 |

Figure 7:
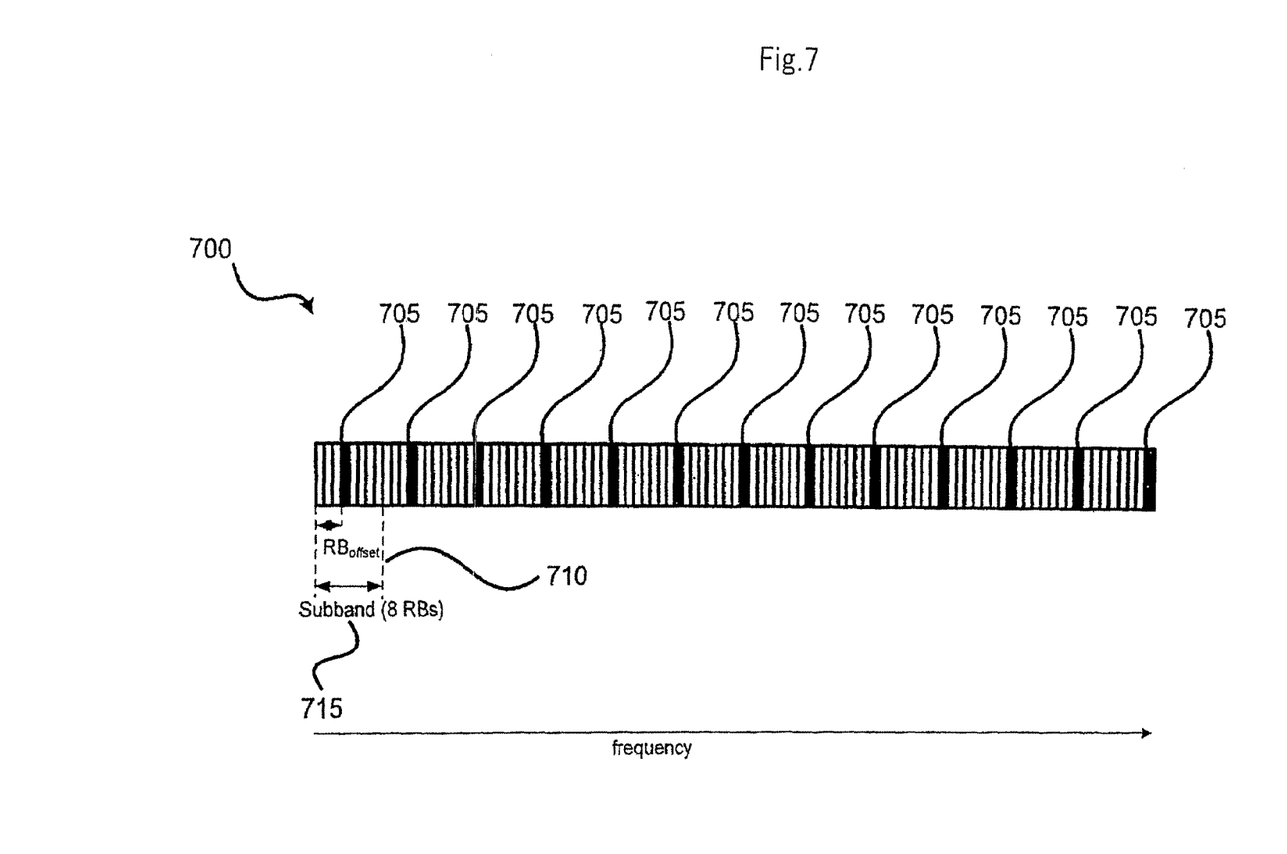
FIG. 7 is a schematic diagram of bandwidth of subframes illustrating the use of the resource block offset parameter $RB_{offset}$.

There is only one resource block in a CQI-RS subband that contains CQI-RS. With this in mind, FIG. 7 shows a schematic diagram of bandwidth (20 Mhz) of subframes 700 (having eight resource blocks in each subband 715) illustrating the use of the resource block offset parameter RBoffset 710. Each subband 715 includes a resource block 705 which contains CQI-RS (the subband size=8 resource blocks). The exact location of the resource block that contains CQI-RS is determined by the parameter RBoffset 710. RBoffset ranges from 0 to k-1.

RBoffset 710 can be either configured by a higher-layer or can cycle from the first resource block to the last resource block within the subband as subframe number increments (i.e. round-robin allocation of the CQI-RS to the resource blocks within the subband).

Figure 8:
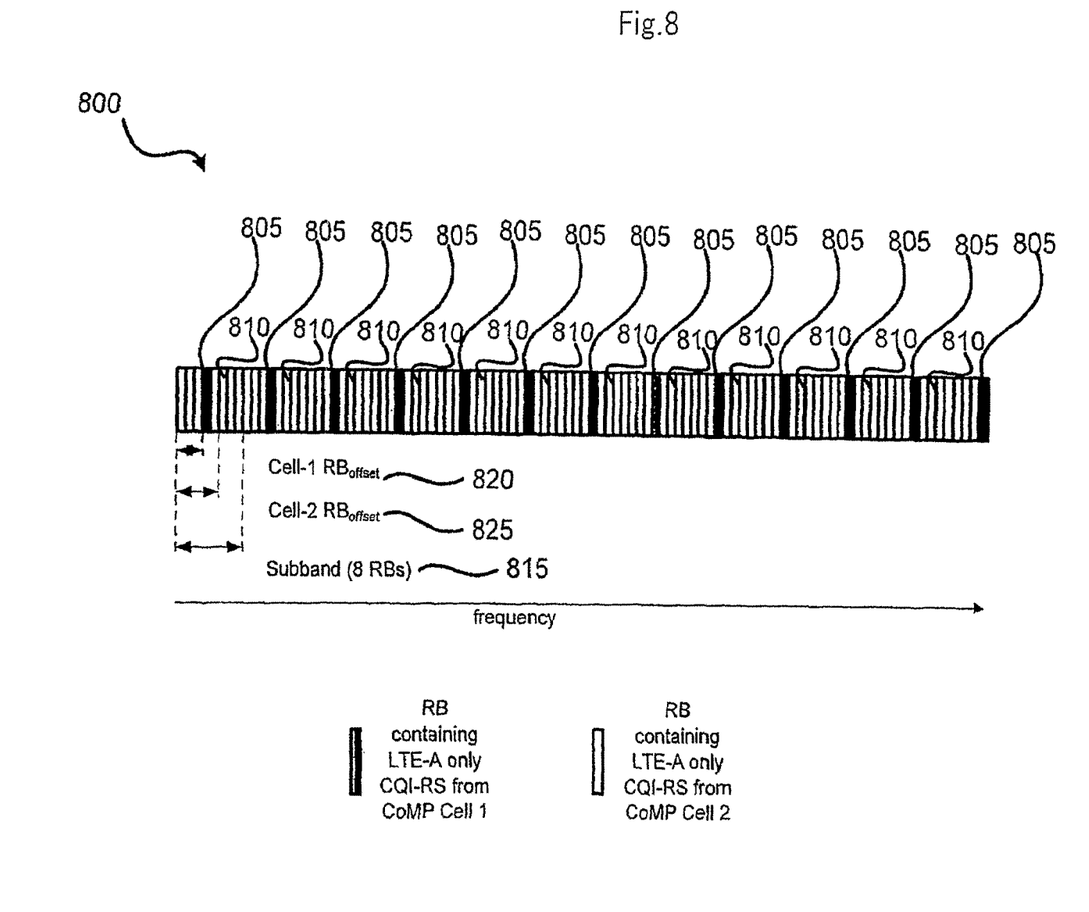
FIG. 8 is a schematic diagram of bandwidth of subframes illustrating the use of the resource block offset parameter $RB_{offset}$ suitable for CoMP cells.

Advantageously, the parameter RBoffset can also be used to mitigate CQI-RS intercell interference among CoMP cells as shown in FIG. 8. In FIG. 8 there shown a Cell-1 RBoffset 820 and a Cell-2 RBoffset 825 within a subband 815. The two offsets are used to avoid CQI-RS of different CoMP cells being transmitted in the same resource block. In case of the round-robin assignment, collision can be avoided by configuring different starting position for different CoMP cell for the round-robin operation.

Advantageously, there is only one resource block in a CQI-RS subband that contains CQI-RS. The total number of resource blocks that contain CQI-RS is determined based on the system bandwidth for a single component carrier.

Advantageously, the resource blocks containing CQI-RS are uniformly distributed over the system bandwidth which means it is able to cover the entire system bandwidth (within a component carrier). This is known as the "wideband" requirement in LTE-A. In a further advantage, the arrangement minimizes the impact on legacy User Equipment (e.g. LTE Rel-8) by minimizing the number of resource blocks that contains CQI-RS within a subband.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

This application is based upon and claims the benefit of priority from Australian provisional patent application No. 2009901196 filed on Mar. 19, 2009 the disclosure of which is incorporated herein in its entirety by reference.

The invention claimed is:

1. A method comprising:
    receiving from a base station two channel quality indicator reference signals in a subframe; and
    transmitting to the base station a report determined according to the two channel quality indicator reference signals, wherein the report comprises a rank indicator, a channel quality indicator, and a precoding matrix indicator, wherein:
        the subframe comprises a resource block and a last orthogonal frequency division multiplexing symbol in the resource block conveys at least one of the two channel quality indicator reference signals;
        a reception period corresponding to a reception comprising the two channel quality indicator reference signals is cell-specific and a channel quality indicator or precoding matrix indicator reporting period is user equipment-specific;
        the two channel quality indicator reference signals are repeated at a period of 5 subframes, 10 subframes, 20 subframes, 40 subframes, or 80 subframes; and
        the reception period is 1 ms, 5 ms, 10 ms, 20 ms, 40 ms, or 80 ms.

2. The method of claim 1, wherein the reception comprising the two channel quality indicator reference signals avoids collision with a cell-specific reference signal, a dedicated reference signal, a physical broadcast channel, a synchronization signal, or some combination thereof.

3. The method of claim 1, wherein the channel quality indicator or precoding matrix indicator reporting period is equal to or longer than the reception period corresponding to the reception comprising the two channel quality indicator reference signals.

4. The method of claim 1, wherein the channel quality indicator reference signal position depends on a cyclic prefix length.

5. The method of claim 1, wherein the base station is configured to be used in a coordinated multi-point transmission.

6. A method comprising:
    transmitting to a user equipment two channel quality indicator reference signals in a subframe; and
    receiving from the user equipment a report determined according to the two channel quality indicator reference signals, wherein the report comprises a rank indicator, a channel quality indicator, and a precoding matrix indicator, wherein:
        the subframe comprises a resource block and a last orthogonal frequency division multiplexing symbol in the resource block conveys at least one of the two channel quality indicator reference signals;
        a transmission period corresponding to a transmission comprising the two channel quality indicator reference signals is cell-specific and a channel quality indicator or precoding matrix indicator reporting period is user equipment-specific;

the two channel quality indicator reference signals are repeated at a period of 5 subframes, 10 subframes, 20 subframes, 40 subframes, or 80 subframes; and the transmission period is 1 ms, 5 ms, 10 ms, 20 ms, 40 ms, or 80 ms.

7. The method of claim 6, wherein the transmission comprising the two channel quality indicator reference signals avoids collision with a cell-specific reference signal, a dedicated reference signal, a physical broadcast channel, a synchronization signal, or some combination thereof.

8. The method of claim 6, wherein the channel quality indicator or precoding matrix indicator reporting period is equal to or longer than the transmission period corresponding to the transmission comprising the two channel quality indicator reference signals.

9. The method of claim 6, wherein the channel quality indicator reference signal position depends on a cyclic prefix length.

10. The method of claim 6, wherein the base station is configured to be used in a coordinated multi-point transmission.

11. An apparatus comprising:
a transmitter that transmits to a user equipment two channel quality indicator reference signals in a subframe; and
a receiver that receives from the user equipment a report determined according to the two channel quality indicator reference signals, wherein the report comprises a rank indicator, a channel quality indicator, and a precoding matrix indicator, wherein:
the subframe comprises a resource block and a last orthogonal frequency division multiplexing symbol in the resource block conveys at least one of the two channel quality indicator reference signals;
a transmission period corresponding to a transmission comprising the two channel quality indicator reference signals is cell-specific and a channel quality indicator or precoding matrix indicator reporting period is user equipment-specific;
the two channel quality indicator reference signals are repeated at a period of 5 subframes, 10 subframes, 20 subframes, 40 subframes, or 80 subframes; and
the transmission period is 1 ms, 5 ms, 10 ms, 20 ms, 40 ms, or 80 ms.

12. The apparatus of claim 11, wherein the transmission comprising the two channel quality indicator reference signals avoids collision with a cell-specific reference signal, a dedicated reference signal, a physical broadcast channel, a synchronization signal, or some combination thereof.

13. An apparatus comprising:
a receiver that receives from a base station two channel quality indicator reference signals in a subframe; and
a transmitter that transmits to the base station a report determined according to the two channel quality indicator reference signals, wherein the report comprises a rank indicator, a channel quality indicator, and a precoding matrix indicator, wherein:
the subframe comprises a resource block and a last orthogonal frequency division multiplexing symbol in the resource block conveys at least one of the two channel quality indicator reference signals; a reception period corresponding to a reception comprising the two channel quality indicator reference signals is cell-specific and a channel quality indicator or precoding matrix indicator reporting period is user equipment-specific;
the two channel quality indicator reference signals are repeated at a period of 5 subframes, 10 subframes, 20 subframes, 40 subframes, or 80 subframes; and
the reception period is 1 ms, 5 ms, 10 ms, 20 ms, 40 ms, or 80 ms.

14. The apparatus of claim 13, wherein the reception comprising the two channel quality indicator reference signals avoids collision with a cell-specific reference signal, a dedicated reference signal, a physical broadcast channel, a synchronization signal, or some combination thereof.

* * * * *